UNITED STATES PATENT OFFICE.

PAUL R. JONES, OF BERKELEY, CALIFORNIA, ASSIGNOR TO BALFOUR, GUTHRIE & CO., OF SAN FRANCISCO, CALIFORNIA, A FIRM.

COMBINED INSECTICIDE AND FUNGICIDE.

1,291,013.  Specification of Letters Patent.  Patented Jan. 14, 1919.

No Drawing.  Application filed March 21, 1917. Serial No. 156,386.

*To all whom it may concern:*

Be it known that I, PAUL R. JONES, a citizen of the United States, residing at Berkeley, in the county of Alameda and State of California, have invented new and useful Improvements in Combined Insecticides and Fungicides, of which the following is a specification.

This invention relates to insecticides and fungicides; and has for its object to combine lime base fungicides with mineral oil insecticides, so that the two may be used together to accomplish the destruction of both insects and fungous diseases in one operation, and in such a way as not to impair the efficiency of either.

The cost of spray materials is no small item, but is usually insignificant as compared to the cost of application. One way of reducing the latter expense is by combination spraying, that is, by mixing two or more spray materials and applying them together. In mixtures of this sort, grave chemical changes may take place which render the mixture wholly unfit for use. On the other hand, the original ingredients may remain unchanged or may be improved by their new associates.

Fungicides of an alkaline nature, as, for instance, lime sulfur or Bordeaux mixture, the latter consisting of a considerable quantity of lime, are very unstable compounds, being easily decomposed by slight influences and especially when mixed with oil sprays. While their own decomposed products may be more or less harmless, the effect on their associates may be of a serious nature. Particularly is this true of the effect upon oil sprays or petroleum soap emulsions, where the oil will be set free and the sulfur or copper, as the case may be, will be precipitated with the resulting possibility of foliage injury due to uneven distribution of the oil. As a result of this combination the fungicides and insecticides are not only permitted to perform their separate functions without interference from each other, but the one is assisted by the other in that the fungicide keeps the insecticide from spotting the fruit or injuring the trees being sprayed and the presence of the insecticide prevents the fungicide from hardening the bark of the trees and causes the fungicide to spread better and more evenly and adhere more closely to the vegetation.

The insecticides under consideration are petroleum soap emulsions, both commercial and homemade, usually made by combining some form of mineral oil or distillate with cresol soap or liquid whale oil soap.

A typical example of a commercial insecticide such as that contemplated in the present invention is "Triumph" which is a mixture of cresol soap, corn oil soap and a certain type of an oil, running between a distillate and lubricating type. Cresol soap is essentially made up of caustic soda, cresylic acid, whale oil and water, with a high percentage of same being cresylic acid and whale oil. Corn oil soap is made up of corn oil, caustic soda, caustic potash, and water. The two soaps are blended together with the oil so that "Triumph" consists of about 80% to 85% mineral oil, 4% to 7% cresylic acid and 4% to 6% water, the remainder being whale oil soap and corn oil soap.

The fungicides under consideration are those containing lime or employing a lime base.

Commercial products of this nature are:

(1) Bordeaux mixture paste, generally containing about 10% active ingredients (copper) and the remainder in inert ingredients, including 2% to 5% lime.

(2) Lime sulfur solution which as labeled under the national insecticide and fungicide law contains as active ingredients calcium polysulfids at least 29%, calcium thiosulfate at least 1.5% and inert ingredients not more than 70%.

In carrying out this invention I employ about 1½ to 3 gallons of insecticide solution and 10 to 25 pounds of paste or powdered fungicide, mixing the same together in the presence of 1 to 1½ pounds of glue, and diluting the mixture in water sufficient to make 200 gallons. When a fungicide solution is used instead of a paste or powder, the quantity should be between 5 and 15 gallons for the above example. The proportions are varied according to the strength desired, depending upon the number of insects or fungous diseases to be combated and the time of year the application is put on and the variety of the fruit which is being sprayed. Also they can be changed to make a strong insecticide and a weak fungicide, or vice versa, depending upon whether the insect pest or fungous disease predominates.

The invention contemplates the combining of homemade as well as commercial insecticides of the character indicated with either homemade or commercial fungicides.

In mixing the various ingredients of this product the oil is first diluted, which, in the case of the cresolated oil mentioned, should be reduced in strength by the addition of an equal amount of water. The fungicide powder or paste should be first dissolved in water or in the case of a fungicide solution diluted with water. The glue is first dissolved in hot water and added to either the insecticide or fungicide or to the tank where the two are mixed. However, it is not advisable to add glue directly to the lime sulfur solution. A tank should be provided to contain the amount of water required to complete the 200 gallons and the diluted oil is preferably poured into the tank first. The mixture in the tank should be well stirred and kept agitated in order that the various ingredients may be thoroughly combined. The mixture is taken from the tank and sprayed upon the vegetation in the usual way.

This combined insecticide and fungicide while useful on deciduous fruits throughout the summer and winter is especially well suited for use on citrus fruit trees and has proven to be very successful in combating various scales, red spider and orange thrips and of material help in controlling some of the fungous diseases, such as twig blight, die back, navel rot, etc.

Two preferred formulas with specific instructions for mixing follow:

*Formula No. 1.*—"Triumph" 1½ to 3 gallons, ground glue ½ to 1½ lbs., Bordeaux mixture paste 10 to 30 lbs.

Dilute the "Triumph", as above, stir up the Bordeaux in the container, then measure out the quantity to be used per spray tank and dilute with an equal volume of water. Prepare the glue, as above, and add to the diluted "Triumph." Fill the spray tank full of water, as above, and while the agitator is running add the diluted Bordeaux, and lastly the diluted "Triumph" containing the dissolved glue, and start spraying.

*Formula No. 2.*—"Triumph" 1½ to 3 gallons, ground glue ½ to 1½ lbs., commercial lime sulfur solution 5 to 15 gallons, water to make 200 gallon tank of spray.

Dilute the "Triumph," as above, prepare the glue, as above, and add to the diluted "Triumph." Pour the concentrated lime sulfur solution into the spray tank full of water while the agitator is running, then add the diluted "Triumph" containing the dissolved glue and start spraying.

These processes can be reversed somewhat, but the above mentioned procedure has usually given the best general satisfaction. In formula No. 1 the dissolved ground glue can be added to the diluted Bordeaux and put into the tank first and the diluted "Triumph" added either first or last. In formula No. 2 the lime sulfur solution can be added to the tank last, but in this case it is better to dilute it with an equal amount of water first. It is not advisable to add the dissolved glue to the concentrated lime sulfur solution but rather to adhere rigidly to the above directions in this formula, that is, adding the dissolved glue to the diluted "Triumph."

Having thus described my invention, what I claim and desire to secure by Letters Patent is—

1. A combined fungicide and insecticide comprising mineral oil in emulsified form and a lime base fungicide, each being present in sufficient quantity to produce its insecticidal or fungicidal effect, and sufficient glue solution to hold said materials in suspension.

2. A combined fungicide and insecticide comprising an emulsified mineral oil insecticide containing cresol soap, lime sulfur solution, and sufficient glue solution to hold said materials in suspension, the mineral oil insecticide and the lime sulfur solution each being present in sufficient quantity to produce its insecticidal or fungicidal effect.

3. A combined fungicide and insecticide having its several ingredients present in the following proportions: about 1½ to 3 gallons of an emulsified mineral oil containing a small percentage of cresol soap, about 5 to 15 gallons of lime sulfur solution, about ½ to 1½ lbs. of ground glue, and between 100 and 200 gallons of water.

In testimony whereof I have hereunto set my hand in the presence of two subscribing witnesses.

PAUL R. JONES.

Witnesses:
G. S. TYLER,
C. C. GUTHRIE.